United States Patent [19]

Kaiser

[11] 3,805,090

[45] Apr. 16, 1974

[54] CIRCUIT FOR ATTENUATING SPURIOUS SIGNALS

[75] Inventor: Walter Kaiser, Erlangen, Germany

[73] Assignee: Siemens Aktiengesellschaft, Berlin & Munich, Germany

[22] Filed: June 2, 1971

[21] Appl. No.: 149,247

[30] Foreign Application Priority Data

June 18, 1970 Germany............................ 2029901

[52] U.S. Cl................... 307/215, 307/237, 307/318, 328/128

[51] Int. Cl. ........................................... H03k 19/36

[58] Field of Search.................... 307/215, 237, 318; 328/128

[56] References Cited

UNITED STATES PATENTS 2,829,282 4/1958 Hughes et al. .................. 307/237 X

*Primary Examiner*—John Zazworsky
*Attorney, Agent, or Firm*—Herbert L. Lerner

[57] ABSTRACT

To suppress spurious signals, the collector electrode and the base electrode of a transistor is bridged by an integrating capacitor. Spurious signals on the input lead which are above a threshold level are diverted by a threshold member such as, for example, a Zener diode, to the reference potential lead.

6 Claims, 2 Drawing Figures

PATENTED APR 16 1974

3,805,090

CIRCUIT FOR ATTENUATING SPURIOUS SIGNALS

DESCRIPTION OF THE INVENTION

Figure 1:
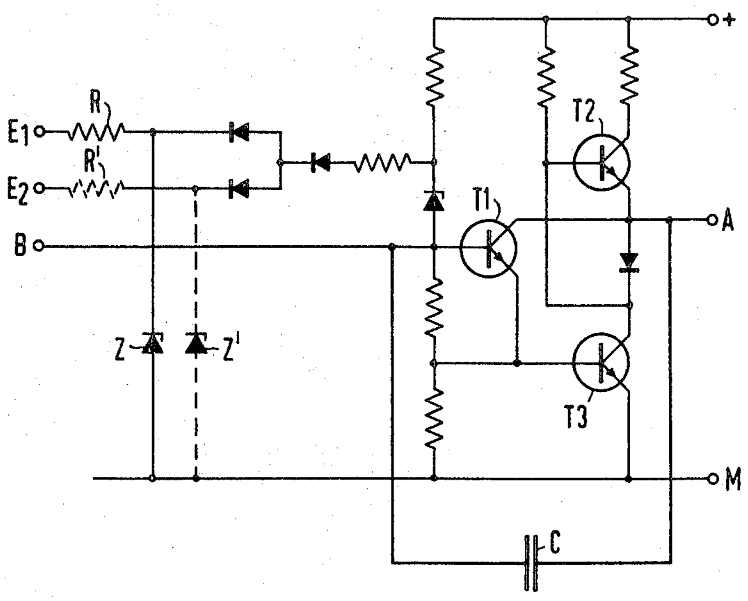

The invention relates to the attenuation or suppression of spurious signals. More particularly, the invention relates to a circuit for attenuating spurious signals.

The noiseless or interference-free transmission of high signal frequencies from the transmitter to the control unit of an electronic system creates many difficulties when the connecting lines are very long and exposed to strong interference or noise. The use of shielded connecting lines may keep mostly capacitative stray effects and may also partly keep inductive stray effects away from the signal line. The use of shielded cables entails higher equipment costs, however. In addition, certain spatial conditions, require that users of control systems, particularly of machine tool control systems, provide the transmitter and the control unit at different, far removed locations. Cable connections are already established between these distant locations and some of the wires of such cable connections have to be utilized for control purposes. It is frequently desired that signals of a higher level be transmitted in the same cable which also contains current or power supply conductors or of which some or a plurality of conductors are utilized for communication transmission such as, for example, telephone and telegraph communication.

Accordingly, it is desired to also transmit electronic control signals with the least interference or noise over long distances at a high signal frequency, using available or existing cables having a plurality of wires, the transmission being via possibly still unused wires. The problem becomes more critical, the more higher frequency integrated circuitry is introduced into industrial electronics. The higher the frequency the more susceptible to interference.

Newer integrated circuits have connecting terminals which are connected directly to the base electrode of the gate input transistor or to the base electrodes of other transistors, so that the base electrode of the input transistor or of the other transistors becomes accessible from the outside and, according to knowledge acquired, may be utilized for noise suppression or anti-interference purposes. Thus, it is possible, for example, to connect a so-called integrating capacitor between the collector electrode and the base electrode of the control transistor of other transistors which may be connected thereafter, or via two and more transistor stages, so that the circuit characteristics may be made as flat as possible to provide thereby a greater interval. It has been discovered that because of this feature, the internal spacing of disturbances, or the noise level, of a control may be increased quite considerably.

The feature of bridging the collector electrode and the base electrode of a silicon planar transistor with an integrating capacitor, in order to slow down the modules which are equipped with such components, is known as such. Investigations conducted in connection with the suppression of spurious signals have shown that even longer input lines or cables, without additional filters, may be guided directly to the input of an integrated circuit, since the connecting of an integrating capacitor between the collector electrode and the base electrode of the transistor or between the collector electrode of one transistor and the base electrode of a transistor connected ahead of such transistor, has the effect of eliminating interference. The input cable must be shielded, however, since strong external interference voltages exceed the dielectric strength of an integrated module and may lead to its destruction.

To eliminate the interference or suppress the noise, it has been suggested to provide the cable connection between the signal transmitter and the module with a Zener diode, at the module input. The Zener diode is connected and controlled in a manner whereby spurious signal voltages above the threshold level on the line are grounded via the Zener diode, while the useful signals having an amplitude below the Zener voltage of the selected Zener diode may be processed without impairment.

An object of the invention is to provide a circuit for attenuating spurious signals with a simple structure and efficiency, effectiveness and reliability.

An object of the invention is to provide a circuit for suppressing noise in high frequency signals, which circuit does not utilize shielded cable or filters.

An object of the invention is a circuit for suppressing or attenuating the spurious signals in the active input circuits or gates of contact-free control and regulating systems and particularly in integrated circuitry comprising NAND gates.

In accordance with the invention, in the active input circuits or gates of contact-free control and regulating systems and particularly in integrated circuitry comprising NAND gates, the collector electrode and the base electrode of the gate input transistor are bridged by an integrating capacitor. The input control signals by a threshold member comprising a Zener diode whose threshold level or Zener voltage is selected to have a magnitude very little above the useful signal voltage.

Effective noise suppression of external disturbances is provided by the combination of attenuating components comprising an integrating or feedback capacitor connected between the collector electrode and the base electrode of the transistor and a Zener diode connected at the module input. The Zener diode diverts the interference or noise voltages which are above the threshold level directly from the input lead to a reference lead and the remnant or Zener voltage, or the voltage-time area, is rendered ineffective by the feedback. This combination offers effective attenuation of noise in a sequence of relatively high frequency signals, without the need for providing cable shielding or for space-requiring filters, for example, in T or $\pi$ form.

Figure 2:
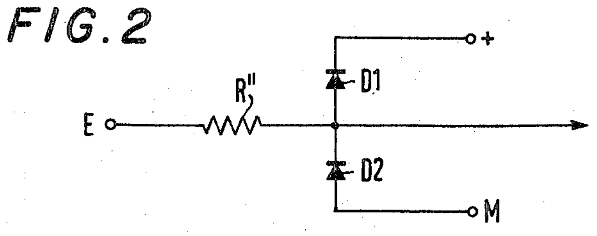

In order that the invention may be readily carried into effect, it will now be described with reference to the accompanying drawing, wherein:

FIG. 1 is a circuit diagram of an embodiment of the circuit of the invention utilized with a NAND gate; and FIG. 2 is a circuit diagram of a modification of the circuit of the invention.

FIG. 1 illustrates a known NAND gate having two input terminals $E_1$ and $E_2$ and an output terminal A. The gate comprises an input transistor T1 and output transistors T2 and T3 in totempole output connection. The base electrode of the transistor T1 is accessible and is connected to an outside terminal B of the module. In accordance with the invention, and as shown in FIG. 1, the input $E_1$ is connected via a Zener diode Z to a reference potential lead M. The Zener diode Z diverts spurious signal voltages having magnitudes which are above the threshold level to the reference potential lead M as they are received via the input $E_1$. The input $E_2$ may also be appropriately connected and, if necessary, may be connected to the reference potential lead M via another Zener diode Z', shown in broken lines.

In accordance with the invention, the collector electrode and the base electrode of the transistor T1 are bridged by an integrating capacitor C. The subsequent connection of the integrating capacitor C in the NAND gate is made possible by the connection of said capacitor to the output terminal A, which is connected to the collector electrode of transistor T1, and the connection of said capacitor to the base electrode of the transistor T1, which is connected to the terminal B.

In order to provide small power losses for the Zener diode Z and Z', it is expedient to connect a resistor in the input lead of the Zener diode. Thus, a resistor R is connected in the input lead of the Zener diode Z and a resistor R', shown in broken lines, is connected in the input lead of the Zener diode Z'. The Zener diode Z, the resistor R and the capacitor C may also be integrated into the module.

If needed, the Zener diode may be replaced by a simple diode, since such diode also has a threshold level. It is recommended that each input E be provided with two diodes D1 and D2, as shown in FIG. 2. One of the diodes such as, for example, the diode D1, is connected to a source of positive potential + and the other of the diodes such as, for example, the diode D2, is connected to the source of reference potential M. The diode D1, connected between the input E and the source of positive voltage +, prevents positive overvoltages and the diode D2, connected between said input and the source of reference potential M, prevents negative overvoltages. The diodes D1 and D2 may also be integrated into the module.

While the invention has been described by means of a specific example and in a specific embodiment, I do not wish to be limited thereto, for obvious modifications will occur to those skilled in the art without departing from the spirit and scope of the invention.

I claim:

1. A circuit for suppressing spurious signals in the active input circuits of contact-free control and regulating systems including integrated circuitry comprising a NAND gate comprising an input transistor having collector and base electrodes, an input terminal for supplying input signals to the input transistor and a reference potential lead, said circuit comprising an integrating capacitor connected between the collector electrode and the base electrode of the input transistor, and a threshold device connected between the input terminal and the reference potential lead having a threshold level very little above the useful signal voltage for diverting spurious signals to the reference potential lead.

2. A circuit as claimed in claim 1, wherein the integrating capacitor and the threshold device are integrated in the integrated gate circuit.

3. A circuit as claimed in claim 1, wherein the threshold device comprises a Zener diode having a Zener voltage very little above the useful signal voltage.

4. A circuit as claimed in claim 1, wherein the NAND gate further comprises a source of positive potential, and wherein the threshold device comprises a first diode connected between the input terminal and the source of positive potential and a second diode connected between the input terminal and the reference potential lead.

5. A circuit as claimed in claim 1, further comprising a resistor, and wherein the threshold device comprises a Zener diode having an input lead and a Zener voltage very little above the useful signal voltage, the resistor being connected in the input lead of the Zener diode.

6. A circuit as claimed in claim 1, wherein the NAND gate comprises first and second input terminals for supplying input signals to the input transistor, wherein the threshold device comprises a first Zener diode having an input lead and a Zener voltage very little above the useful signal voltage and a second Zener diode having an input lead and a Zener voltage very little above the useful signal voltage, and further comprising a first resistor connected in the input lead of the first Zener diode and a second resistor connected in the input lead of the second Zener diode.

* * * * *